D. C. MULVIHILL.
LIFTING JACK.
APPLICATION FILED MAY 15, 1919.
1,343,274.
Patented June 15, 1920.
2 SHEETS—SHEET 1.
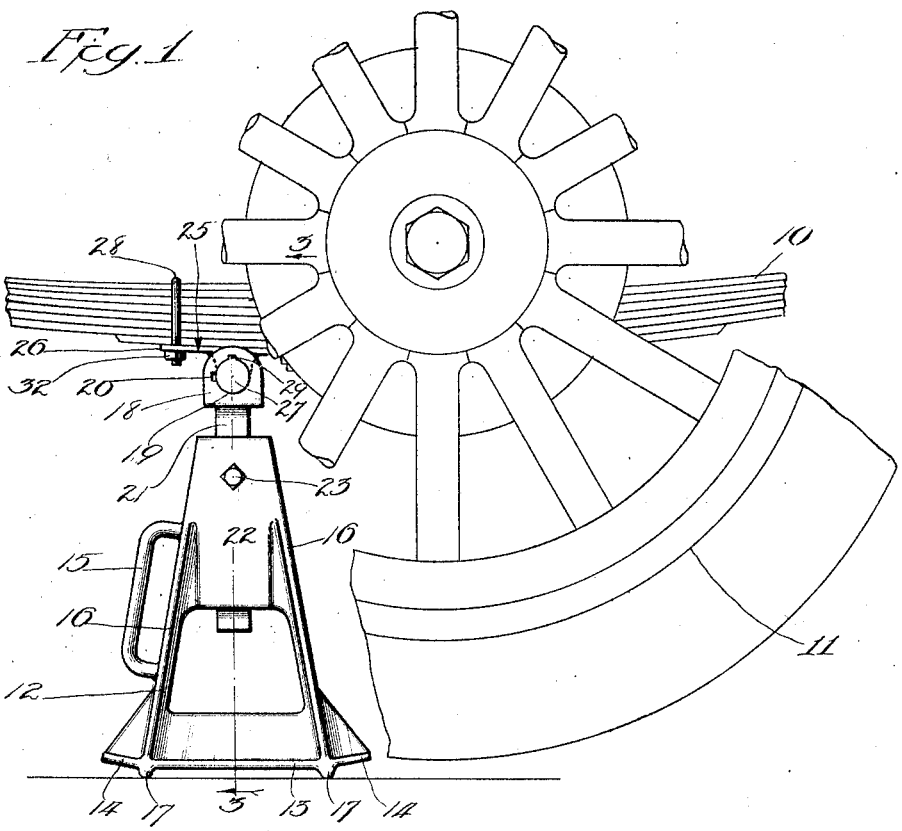
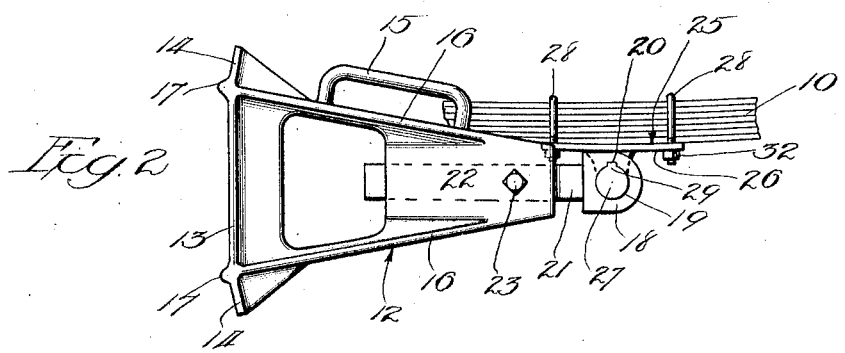
Witness:
Harry S. Gaither
Inventor:
Daniel C. Mulvihill
by Charles O. Shervey,
his Atty D. C. MULVIHILL.
LIFTING JACK.
APPLICATION FILED MAY 15, 1919.
1,343,274.
Patented June 15, 1920.
2 SHEETS—SHEET 2.
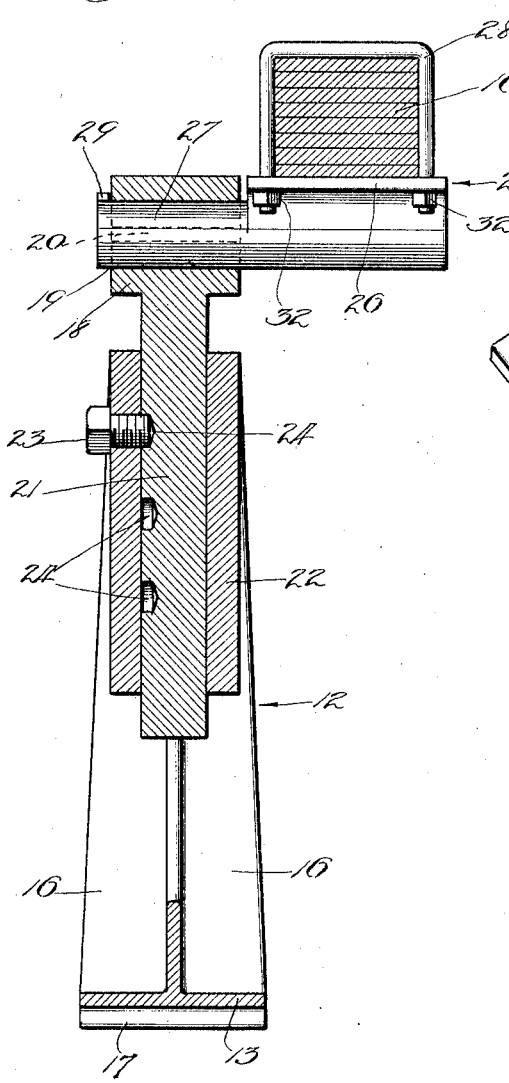
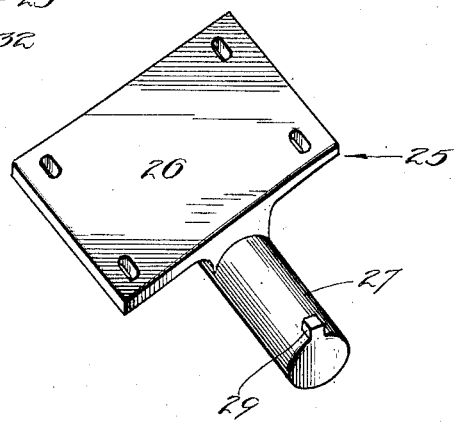
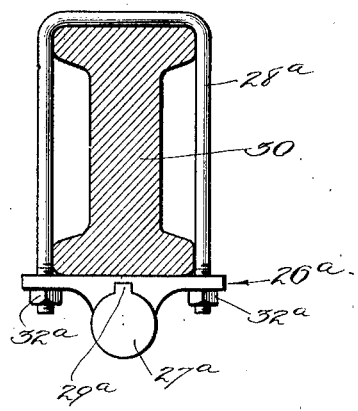
Witness:
Harry S. Gaither
Inventor:
Daniel C. Mulvihill
by Charles O. Shrvey
his Atty

UNITED STATES PATENT OFFICE.

DANIEL C. MULVIHILL, OF HANNIBAL, MISSOURI.

LIFTING-JACK.

1,343,274.      Specification of Letters Patent.      Patented June 15, 1920.

Application filed May 15, 1919. Serial No. 297,193.

*To all whom it may concern:*

Be it known that I, DANIEL C. MULVIHILL, a citizen of the United States, and a resident of Hannibal, Marion county, and State of Missouri, have invented certain new and useful Improvements in Lifting-Jacks, of which the following is declared to be a full, clear, and exact description.

This invention relates to lifting jacks, and its principal object is to provide a jack which may be readily and quickly attached to, and detached from a vehicle, and which can be used for lifting the vehicle without any great amount of effort on the part of the user. This invention has reference, more particularly to that class of lifting jacks used for lifting motor vehicles, in which the lifting action is caused by the straightening up of the jack from an inclined position. Usually jacks of that class are attached to the wheel of the vehicle, but with many types of motor vehicles, the wheel itself is removed for the purpose of changing a tire in case of injury thereto. My present invention contemplates a jack which is capable of attachment to the frame or chassis portion of the vehicle, whereby the lifted wheel is left free to be removed if desired. The invention consists of the several novel features hereinafter fully set forth and claimed.

The invention is clearly illustrated in the accompanying drawing, in which:

Figure 1 is a side elevation of fragments of a motor vehicle spring and wheel, with a simple form of the present invention applied thereto;

Fig. 2 is a side elevation of a fragment of the spring and showing the lifting jack body in a position occupied in attaching it to or detaching it from the vehicle;

Fig. 3 is a detail section taken on line 3—3 of Fig. 1;

Fig. 4 is a perspective view of a trunnion member which is fastened to the vehicle spring, and Fig. 5 is a cross section of an automobile axle showing a slightly modified form of trunnion member.

Referring to said drawing, the reference character 10 designates a fragment of one of the leaf springs of a motor vehicle and 11 designates a fragment of one of the wheels. In the standard makes of automobiles the springs extend lengthwise of the body of the vehicle and are fastened to the axles by suitable clips, as is well known.

The body 12 of the jack is preferably constructed of ribbed or webbed material for the sake of obtaining strength and lightness, and it may be substantially triangular in shape. Its base portion 13 has inclined end portions 14, and two of the ribs 16 may be continued under the base portion to provide spurs or grips 17. The upper end of the jack has a bearing block 18 formed with a bearing aperture 19 extending transverse to the plane of the body of the jack, and a groove 20, is formed in the face of the bearing aperture. Said bearing block may be formed integral with the body of the jack if desired, but I have shown it as formed separately therefrom and adjustable with respect thereto. In the form illustrated, the bearing block is provided with a post or stem 21, slidably mounted in a housing 22 formed at the upper end of the body portion 12. Means are provided for securing said post in the housing at various positions of adjustment, and as shown, said means comprise a bolt or screw 23 threaded in the housing and entering any of a number of notches or recesses 24 formed in the post. By unscrewing the bolt or screw 23 the post may be adjusted in the body to vary the length of the jack to accommodate wheels of different diameter. Conveniently a handle 15 is formed on one end of the body 12 whereby it may be handled with ease. Secured to the frame or chassis of the vehicle, and as a matter of preference, to the four springs thereof, are trunnion members 25 to which the body of the jack may be quickly and easily attached. Conveniently the trunnion member may comprise a plate 26 having a trunnion 27 projecting therefrom in a horizontal direction transverse of the vehicle and parallel with the axes thereof. The trunnion members may be secured to the springs by U-bolts 28 that pass around the springs and extend through transverse slots formed in the plates 26. Nuts 32 are secured upon the threaded ends of the U-bolts and bear against the plates, and secure them to the springs. As a matter of preference the trunnion members are fastened to the undersides of the springs immediately in front of the forward axle and immediately behind the rear axle. At the outer end of the trunnion is a radially extending lug 29 which engages with the outer face of the bearing block 18 and prevents accidental disconnection between the jack body and trunnion member when in use. The groove 20 in the bearing block admits of the passage of the lug 29 through the block.

The modified form shown in Fig. 5 is intended for use on motor vehicles other than standard makes or for instance on the "Ford" cars. In this case the trunnion members 26ª are attached to the axles, the front one of which is shown at 30. The U-bolts 28ª extend over the axle and through the trunnion member 26ª, and have nuts 32ª threaded on their lower ends. The trunnion 27ª extends parallel with the axle as in the preferred form and has the lug 29ª as in the preferred form.

When it is desired to jack up any corner of the vehicle the jack body is attached to the trunnion member by slipping the bearing block over the trunnion (see Fig. 2), and permitting it to swing down until its base touches the ground or floor upon which the vehicle stands. The vehicle is then moved in a direction toward the end to be jacked up, either manually or by the motor. This movement of the vehicle will cause the jack body to swing upon the corner of the base touching the ground or floor as a pivot, and as the jack body straightens up it will lift the vehicle until it reaches an upright position resting upon its base, when the movement of the vehicle should be stopped.

To detach the jack the vehicle is moved forward or backward, as the case may be. The jack will thereby be tilted over, permitting the wheel to rest on the ground. The jack is then swung up bringing the slot 20 into register with the lug 29, and slipped off the trunnion.

It is especially useful in removing tires, rims or the wheels themselves, and by using four jacks the entire vehicle may be jacked up to take the load off the tires.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A lifting jack for vehicles, comprising a pivot member fixedly secured to the running gear of a vehicle provided with a rigid trunnion projecting laterally from one side of the pivot member, and a jack body pivotally and detachably secured to the trunnion of said pivot member, said jack body being adapted to rest in a tilted position upon the surface supporting the vehicle, and capable of being moved into an upright position by endwise movement of the vehicle, whereby said vehicle is lifted when the jack body straightens up.

2. A lifting jack for vehicles, comprising a trunnion member adapted to be fixedly secured to the running gear of a vehicle and having a laterally projecting trunnion, and a jack body pivotally and detachably secured to said trunnion and arranged to rest in a tilted position upon the surface supporting the vehicle, said jack body supporting the vehicle in lifted position when the jack body is straightened up.

3. A lifting jack for vehicles, comprising a trunnion member, means for detachably fixedly securing it to the spring of a vehicle running gear, said member having a laterally projecting trunnion, and a jack body having a wide base portion and pivotally and detachably secured to said trunnion, said jack body (when in upright position) supporting the vehicle in lifted position and capable of being tilted by endwise movement of the vehicle to leave the vehicle unsupported by it.

4. A lifting jack for vehicles, comprising a trunnion member fixedly-secured to the vehicle and having a trunnion projecting laterally therefrom, and a jack body having a lengthwise adjustable bearing member pivotally and detachably secured on said trunnion.

5. A lifting jack for vehicles, comprising a trunnion member adapted to be fixedly secured to the running gear of a vehicle and having a trunnion projecting laterally therefrom, said trunnion member having a retaining lug upon its free end, and a jack body having a bearing aperture for the reception of said trunnion member, the face of said bearing aperture being formed with a groove, to receive said lug, and said lug operating when the parts are assembled to retain the jack body upon the trunnion member when the lug and groove are not in register.

6. A lifting jack for vehicles, comprising a trunnion member having a trunnion projecting laterally from one side thereof, means for securing the same upon the spring of a vehicle running gear, and a jack body formed with a housing, and a bearing member arranged to be secured in said housing at various positions of adjustment and having a bearing aperture whereby the jack body may be freely slipped on said trunnion to pivotally connect the jack body with the trunnion member.

7. A lifting jack for vehicles, comprising a trunnion member formed with a laterally projecting trunnion and a plurality of elongated slots, U-bolts extending through said slots and embracing a leaf spring of a running gear of a vehicle, nuts on the ends of said U-bolts bearing against the trunnion member, and a jack body having a wide base and having a bearing block pivotally and detachably secured to said trunnion.

D. C. MULVIHILL.